Jan. 6, 1931.   F. TWYMAN ET AL   1,788,135
PRODUCTION OF COLORED DESIGNS AND THE APPLICATION
THEREOF TO THE MANUFACTURE OF WOVEN FABRICS
Filed March 20, 1929   2 Sheets-Sheet 1
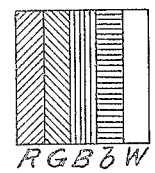
Fig.1.
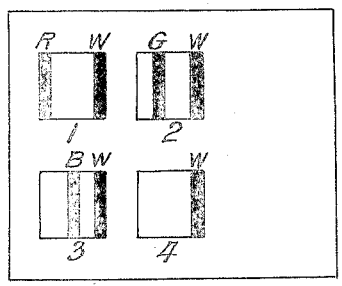
Fig.2. 1st negative
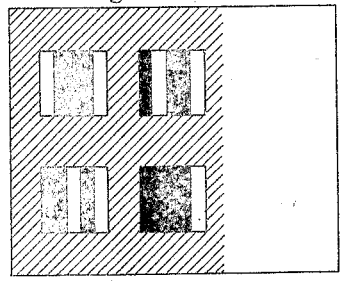
Fig.3. Positive from 1st negative
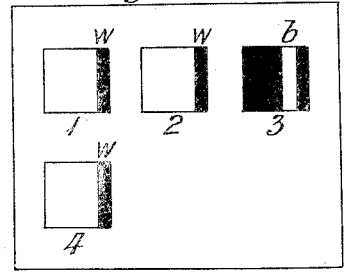
Fig.4. 2nd negative
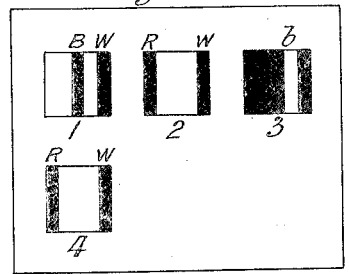
Fig.5. Alternative 2nd negative
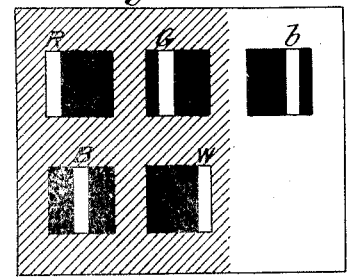
Fig.6. 2nd negative + positive
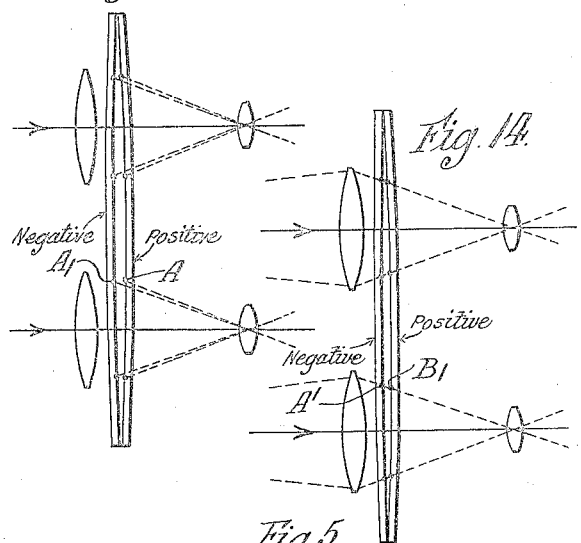
Fig.13.
Fig.14.
Inventors
Frank Twyman
Charles F. Smith
By their Attorneys,
Baldwin & Wight Jan. 6, 1931. F. TWYMAN ET AL 1,788,135
PRODUCTION OF COLORED DESIGNS AND THE APPLICATION
THEREOF TO THE MANUFACTURE OF WOVEN FABRICS
Filed March 20, 1929 2 Sheets-Sheet 2

1st negative

R G B b W O

Positive

2nd negative

Alternative 2nd negative

2nd negative + positive

Inventors
Frank Twyman
Charles F. Smith
By their Attorneys,

Patented Jan. 6, 1931

1,788,135

UNITED STATES PATENT OFFICE

FRANK TWYMAN AND CHARLES FREDERICK SMITH, OF LONDON, ENGLAND, ASSIGNORS TO ADAM HILGER, LIMITED, OF LONDON, ENGLAND

PRODUCTION OF COLORED DESIGNS AND THE APPLICATION THEREOF TO THE MANUFACTURE OF WOVEN FABRICS

Application filed March 20, 1929, Serial No. 348,643, and in Great Britain March 23, 1928.

This invention is an improvement in or modification of the process described in U. S. Patent No. 1,657,415, issued January 24, 1928, to C. F. Smith and relates to the application of that process for the production of colored designs for woven fabrics.

In the production of designs for woven fabrics no accurate idea of the appearance of the finished fabric can be obtained from drawings or paintings, except such as reproduce with enormous labour the most minute details of the textile. So great would the labour be in the production of adequate drawings and paintings that in practice the procedure is, once the weaving scheme is decided on, to set up a loom for the production of a number of color combinations from which are selected those which seem most suitable for the purpose for which the cloth is to be used.

The process described in U. S. Patent 1,657,415 can be employed so that this labour and expense is avoided. The first thing is to decide on the weaving scheme and the number of colors which shall be employed in realizing it. This weaving scheme being controlled on the loom by the Jacquard cards or other known devices, it then remains to be decided what colors are to be selected for the warps and wefts, and it is at this point that our process commences. A trial piece of fabric is woven. In this trial piece the threads, whether warps or wefts, which are intended to be woven in each one of the different colors, are woven of threads dyed with a distinctive color which can be separately photographed in the following way:—

Suppose, for instance, three colors are involved, the weaving would preferably be done from threads of three colors, red, green and blue, these colors being so selected that they can be photographed through filters which would suppress in turn any two of the three colors.

From the negatives so photographed positives are made (or the negatives can be reversed chemically) and these are mounted in a suitable lantern or lanterns so that the elements of the woven pattern are projected in mesh on a screen. An alternative method is to photograph through filters which suppress any one of the colors in turn but which transmit the other two colors, in which case the negative may be used for projection.

The three elements of the pattern can then be colored on the screen by the interposition in the respective beams of light of color filters and means for altering the brightness. These filters can be changed until a pleasing pattern has been effected.

The simulation of sheen effects may be effected by photographing the colored pattern, with or without the interposition of filters, the exposure being adjusted so as to reproduce the high lights only. A positive having been made from the negative, this is projected in mesh simultaneously with the remainder of the pattern as described above.

Alternatively, sheen may be simulated by projecting a colored pattern by the method described above on a white screen composed of the kind of material it is intended to imitate, the said screen being illuminated by a very oblique beam of white or other colored light, the direction being such that there is no great dilution of the colors of the projected images of the threads.

In the application of the process described in Patent No. 1,657,415 referred to above, to woven fabrics in cases where there are so many colors that all parts except of one color in the basic design cannot be directly suppressed and accordingly a separate negative cannot be directly taken of each of all the parts of the basic design, the method of producing the transparencies is by weaving a specimen having the desired pattern configuration in contrasting colors, photographing the specimen through various color filters corresponding to the colors of the specimen in order to obtain a set of negative images with various color constituent parts of the original suppressed, forming positives or reversals of certain of the negative images and producing the required transparencies from the negative and positives, superposing an appropriate negative image on a positive image in cases where the latter is an image with more than one color constituent of the original unsuppressed. This is illustrated by the following example:—

For a pattern consisting of five differently colored components a sample is prepared in which the five components are colored by means of dyes or other coloring agents in, for example, red, green, blue, black and white; photographing the red and white, green and white, blue and white, through red, green and blue filters, and the white component by a short exposure through another green filter or without a filter, and making a positive from the negative or negatives thus prepared. A further negative is made by photographing the white component three times with the other green filter referred to above, or without a filter, the exposure being adjusted to restrain the red, green and blue colors, and a fourth photograph is made with or without a filter simultaneously of the red, green, blue and white components of the pattern. The positive and second negative are bound or cemented together face to face, and the result of correct positioning of the various positive and negative images is that in the second negative the three components of the pattern corresponding to white are superimposed on the portions of the three images corresponding to white in the positive images containing the red and white, green and white, and blue and white. The fourth image in the positive corresponding to the red, green, blue and black threads, but less the white, is unimpeded by any image in the second negative. The fourth image in the second negative corresponding to red, green, blue and white, but less black, is also unimpeded by any image in the positive. The result is that in the composite transparency thus formed there are five transparent portions corresponding respectively to the red, green, blue, black and white threads of the original pattern, each of which may be projected on the screen in mesh with the remainder and independently variable in color and brightness.

The above method is illustrated diagrammatically by Figures 1 to 6 of the accompanying drawings, in which:—

Figure 1 represents a simple striped pattern in red (R), green (G), blue (B), black (*b*) and white (W).

Figure 2 represents the first negative containing four images (1, 2, 3, 4) of the pattern photographed respectively with red, green, blue and with another green filter or without any filter.

Figure 3 represents a positive from the first negative.

Figure 4 represents the second negative containing four images (1, 2, 3, 4) of the pattern, three (1, 2, 4) of the white portion only photographed with or without a filter, and the fourth (3) of all components except the black photographed with or without a filter.

In order to avoid excessive over-exposure of the white when isolating the black (3) it is desirable to give three consecutive exposures through the red, green and blue filters respectively of the times appropriate to these colors.

Figure 5 represents an alternative second negative containing three images (1, 2, 4) of the pattern photographed respectively through blue, red, and red filters, and a fourth image (3) of all components except the black.

Figure 6 represents the final transparency obtained by cementing together face to face the positive and either of the second negatives.

For a pattern consisting of six differently colored components a sample is prepared in which the six components are colored in, for example, red (R), green (G), blue (B), black (*b*), white (W), and orange yellow (O). This method is illustrated diagrammatically by Figures 7 to 12 of the accompanying drawings, in which:—

Figure 7:
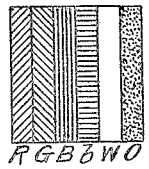

Figure 7 represents a simple striped pattern in the six colors.

Figure 8:
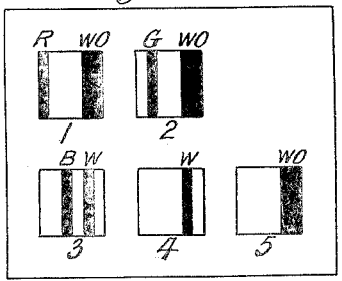

Figure 8 represents the first negative containing the following five images of the pattern:—

(1) Red, white and orange-yellow components, photographed through a red filter.
(2) Green, white and orange-yellow components, photographed through a green filter.
(3) Blue and white components photographed through a blue filter.
(4) The white component photographed through another green filter.
(5) The white and orange-yellow components through another green filter, or alternatively by illuminating the sample with the light obtained by a sodium burner.

Figure 9:
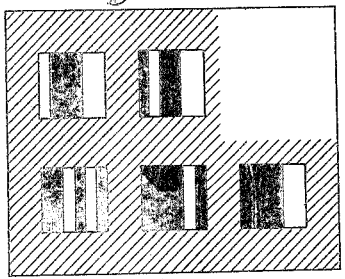

Figure 9 represents a positive from the first negative.

Figure 10:
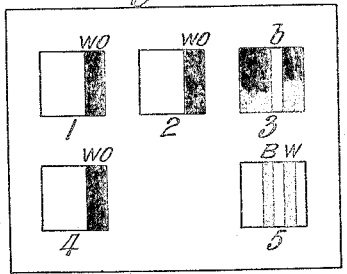

Figure 10 represents a second negative containing the following five images of the pattern:—

(1) White and orange-yellow components obtained as in first negative.
(2) Same as (1).
(3) All the components except black photographed simultaneously with or without a filter.
(4) Same as (1).
(5) Blue and white components photographed as in first negative.

Figure 11:
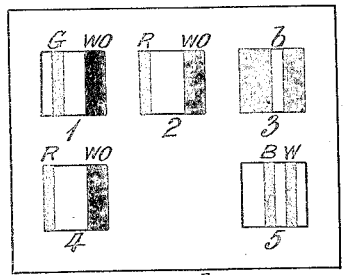

Figure 11 represents an alternative second negative containing the following five images (obtained as described above) of the pattern:—

(1) Green, white and orange-yellow.
(2) Red, white and orange-yellow.
(3) All components except black.
(4) Same as (2).
(5) Blue and white.

Figure 12:
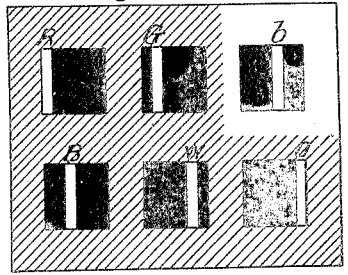

Figure 12 represents the positive and either of the second negatives bound or cemented together with correct positioning so that six images of the individual colored components are produced.

Figure 15:
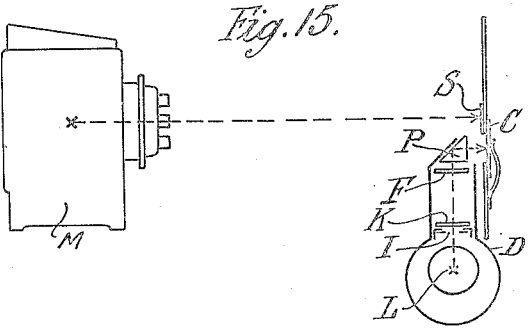

Figure 13 is a diagrammatic view of an apparatus for making a positive plate from a negative plate, illustrating how errors in registration may be introduced as a result of one or both plates not being perfectly flat;

Figure 14 is a diagrammatic view of an apparatus for making a positive plate from a negative plate in accordance with our invention by means of which the harmful effects usually caused by imperfect registration of the positive and negative plates are prevented;

Figure 15 is a diagrammatic view of an apparatus for matching various colors and shades of pattern cards of samples with the colors and shades of a projected beam of light.

The photographic plates employed for carrying out the invention may be panchromatic or color sensitive plates.

The method preferred by us for making the positive is as follows and has been found by us to secure more perfect registration of the pictures particularly where positives and negatives have to be used together as described above. When positives and negatives have to be used together, then unless the photographic plates or films are perfectly flat (which is rarely the case) errors of registration may occur, since points A and $A_1$ (see Figure 13) which print opposite each other do not project in register.

If, however, in printing the light reaches the sensitive film on which the positive is to be impressed by the same path as that to be used in projection as in Figure 14, then the points $A_1$ and $B_1$ are printed in such positions on the positive as to register in projection with the corresponding points in the negative.

It will be understood that the several images may be carried on a single plate, or alternatively each image may be contained on a separate plate. In the latter case parallax troubles due to plate curvature can be minimized and there is an economy of material in making positives and in the separate photographic treatment of the various images where it is demanded owing to difficulties of exposure and contrast. Each projection lens in the projecting apparatus may have separate focussing motion, and, if the plates are separate, enlargement or reduction of any convenient ratio is obtained by displacement of the plates, combined with a focusing motion of the projection lenses. Eccentricity due to focusing motion of any lens can be corrected by further displacement of the corresponding plate. If the projection lenses are fixed, there may be provided movement of the whole, or any one, of the transparencies, towards or away from the projection lenses to compensate for the extra thickness of glass introduced between the photographic image and the projection lenses, due to the cementing of negatives and positives, and for differences of thickness of the interposed glass. Each image or plate may be illuminated by condenser and separate light source; for instance, six images would then require six condensers and six lamps. The use of separate lamps results in an economy of current.

The use of separate negatives (and transparencies) as referred to above, for each color has the advantage that in taking the negatives, plates of different color sensitivities may be used for each negative which assists the action of the filters in the complete suppression of the colors which are not wanted in each negative. Thus where it is desired to remove red, orange and green effectively, an ordinary plate, sensitive to the blue and violet only, is used. Where only the red is required to be suppressed, an orthochromatic plate is used.

With the same purpose in view, namely, the complete suppression of the unwanted colors in each negative, whether the latter are separated or not, there may be used when desired illuminants whose charateristics are such that their spectra consist of one or more monochromatic radiations, and the contrasting colors in the specimen are produced by dyes each of which transmits a region of the spectrum restricted as nearly as possible to one of the spectrum lines produced by the illuminant. For example, a mercury vapour lamp may be used, the well known spectrum of which contains strong lines in the yellow, green and violet regions, and a specimen suitable for use with this illuminant would be colored yellow, green and violet, the added black, white and red being dealt with by the means described elsewhere in this specification.

It should be understood that where necessary for the illumination of a particular color (using the word color in the wider sense which includes the ultra-violet) ultra-violet light may be used with lenses of suitable material.

Filters may be selected which transmit one or more radiations of the spectrum of the illuminant, but which absorb remaining radiations, and the combination of the spectral characteristics of the illuminant, the filters, the dyes used in the specimen, and the photographic plate results in the complete suppression of any one color. With the same purpose in view, namely, the complete suppression of the unwanted colors in each negative, the prepared sample may be immersed in a transparent liquid the refractive index of which is the same, or nearly the same, as that of the fibres composing the dyed threads of the prepared sample, with the object of preventing surface reflection from each fibre, which surface reflection is spectrally characteristic of the illumination of the whole prepared pattern, is little affected by the dye of the fibre under consideration, and which is therefore difficult to eliminate by any filter.

The production of a pattern on the screen, projected in the colors and shades which give a pleasing impression, does not necessarily complete the process inasmuch as these colors and shades must be converted into actuality in the form of woven material, which should present the same appearance in daylight as in the room in which projection takes place. Accordingly the beam from the projection apparatus of which it is desired to register the color may be directed by suitable optical deflectors or reflectors, or without intervening optical parts into a trichromatic colorimeter, e. g., a "Guild" colorimeter, which is an accurate color measuring apparatus. A record of each color of the color design projected is obtained with this instrument, and in subsequent preparation or selection of the colors, or colored materials, the latter when illuminated by daylight are matched against the colors reproduced on the trichromatic colorimeter by means of these records. A color produced on a Guild trichromatic colorimeter may be reproduced with extreme accuracy on another instrument of the same type when similar settings of the scales are made. When, therefore, the colors produced and measured by the Guild trichromatic colorimeter are required to be transmitted to the manufacturer of the colored design, the color data so obtained corresponding to each element of the color design may be sent to him so that he can reproduce these colors by a second Guild trichromatic colorimeter.

According to another method matching of the various colors and shades may be effected by receiving each of the colored beams in turn on a small white screen placed in close proximity to an opening or receptacle into which samples of colored material, or colored cards, may be placed, which colored samples are illuminated by a beam of light equivalent to daylight, the coloring of the samples or cards being varied until the color is very closely the same as that of the color of the beam from the projection apparatus which has been approved as a component of the color scheme.

This is illustrated in Figure 15 in which M represents the projection apparatus, S a white screen in position to receive a particular colored beam, C a pattern card adjacent the screen S but out of the path of the beam, D an apparatus for illuminating the pattern card with artificial daylight comprising a source of light L, a diffusing screen K, and an iris diaphragm I, (for varying the intensity of illumination), F a daylight filter, and P a reflector prism.

As previously stated this process may be carried out by superposing a negative on a positive, that is to say, a positive previously made on a separate plate from a negative, or by superposing a negative upon a chemically reversed negative. The term positive as used in the claims is, therefore, intended to embrace both positives made on a separate plate from a previously developed negative or a reversed negative.

What we claim is:—

1. In the production of colored designs by projecting into proper mesh upon a screen beams of light passed through transparencies embodying images of the respective color constituent parts of a basic design individually isolated under conditions such that the coloration and intensity of the several projected beams can be individually varied at will, the application of the process to woven fabrics and the method of producing the transparencies for such application in cases where there are so many colors that all parts except of one color in the basic design cannot be directly suppressed and accordingly a separate negative cannot be directly taken of each of all the parts of the basic design, such method consisting in weaving a specimen having the desired pattern configuration in contrasting colors, photographing the specimen through various color filters corresponding to the colors of the specimen in order to obtain a set of negative images with various color constituent parts of the original suppressed, forming positives of certain of the negative images and producing the required transparencies from the negatives and positives, superposing an appropriate negative image on a positive image in cases where the latter is an image with more than one color constituent of the original unsuppressed.

2. The process of producing colored designs for woven fabrics from a basic design in which there are so many colors that all colors in the design with the exception of one color can not be directly suppressed and accordingly a separate negative cannot be directly taken of each of all the parts of the design, said process comprising weaving a specimen having the desired pattern configuration in contrasting colors, photographing the specimen through various color filters corresponding to the specimen to obtain a set of negative images with various color constituent parts of the original design suppressed, forming positives of certain of the negative images, producing transparencies from the positives and negatives, superposing an appropriate negative image on a positive image in cases where the latter is an image with more than one color constituent of the original unsuppressed projecting beams of light through the transparencies to reproduce the configuration of the basic design, and coloring and varying said beams at will until the reproduced design has a desired appearance.

3. Process as claimed in claim 1 in which for the purpose of obtaining complete suppression of the unwanted colors in a negative the specimen is illuminated with an illuminant whose spectrum consists of one or more predetermined monochromatic radiations.

4. Process as claimed in claim 1 in which for the purpose of obtaining complete suppression of the unwanted colors in a negative the specimen is illuminated with an illuminant whose spectrum consists of one or more predetermined monochromatic radiations and in which the contrasting colors in the specimen are produced by dyes each of which transmits a region of the spectrum restricted substantially to one of the spectrum lines produced by the illuminant.

5. Process as claimed in claim 1 in which the specimen comprises parts colored yellow, green and violet and these are isolated by photographing the specimen when illuminated by the light of a mercury vapour lamp.

6. Process as claimed in claim 1 in which an auxiliary effect, such as a "sheen" is produced by an auxiliary transparency, e. g., a photographic positive image of the high lights.

7. Process as claimed in claim 1, in which one set of negative images is taken on a single plate and a positive prepared therefrom, which positive is bound or cemented to a second negative carrying a different set of images.

8. Process as claimed in claim 1, in which the colors in which the pattern is to be woven are determined by recording the colors of the projected and approved components with the aid of a colorimeter.

9. Process as claimed in claim 1 in which the colors in which the pattern is to be woven are determined and recorded by illuminating colored cards by daylight or the equivalent and matching them against the various selected colored components of the projected design.

In testimony that we claim the foregoing to be our invention, we have signed our names this 8th day of March, 1929.

FRANK TWYMAN.
CHARLES FREDERICK SMITH.